US011157708B2

(12) United States Patent
Verghese et al.

(10) Patent No.: US 11,157,708 B2
(45) Date of Patent: Oct. 26, 2021

(54) METHOD AND SYSTEM FOR IDENTIFYING SENSORS ON MACHINES

(71) Applicant: Caterpillar Inc., Peoria, IL (US)

(72) Inventors: Sandeep John Verghese, Apex, NC (US); Nicholas Dodge, Raleigh, NC (US)

(73) Assignee: Caterpillar Inc., Peoria, IL (US)

(\*) Notice: Subject to any disclaimer, the term of this patent is extended or adjusted under 35 U.S.C. 154(b) by 0 days.

(21) Appl. No.: 16/778,430

(22) Filed: Jan. 31, 2020

(65) Prior Publication Data

US 2021/0240948 A1 Aug. 5, 2021

(51) Int. Cl.
*G06K 7/10* (2006.01)
*G06K 19/07* (2006.01)
*H04W 4/38* (2018.01)

(52) U.S. Cl.
CPC ..... *G06K 7/10099* (2013.01); *G06K 19/0716* (2013.01); *H04W 4/38* (2018.02)

(58) Field of Classification Search
None
See application file for complete search history.

(56) References Cited

U.S. PATENT DOCUMENTS

| 6,611,741 | B2 | 8/2003 | Michi et al. |
| 10,220,511 | B2 | 3/2019 | Linnell et al. |
| 2012/0201640 | A1* | 8/2012 | Jessen .................. E02F 9/2203 414/694 |
| 2018/0300319 | A1 | 10/2018 | Burriesci et al. |

FOREIGN PATENT DOCUMENTS

| CN | 102463857 | | 6/2015 |
| KR | 100783960 | | 12/2007 |
| KR | 101928507 | | 12/2016 |
| KR | 101928507 | B1 * | 12/2018 |

\* cited by examiner

*Primary Examiner* — Kristy A Haupt
(74) *Attorney, Agent, or Firm* — von Briesen & Roper, s.c.

(57) ABSTRACT

A method for identifying a sensor among as plurality of identical sensors on a machine is disclosed. The method includes comparing, by a controller, a unique value of a parameter detected by the sensor with a predefined value of the parameter. The unique value of the parameter is detected in a predefined stationary state of at least one part of a plurality of parts of the machine. The method further includes associating, by the controller, the unique value of the parameter detected by the sensor with the at least one part when the unique value of the parameter matches with the predefined value of the parameter. The predefined value of the parameter corresponds to a value of the parameter attained by the at least one part in the predefined stationary state of the at least one part.

20 Claims, 4 Drawing Sheets

| PART OF MACHINE | ORIENTATION |
|---|---|
| WORK IMPLEMENT | 90° |
| ARMS | 70° |
| .... | .... |

*FIG. 3*

METHOD AND SYSTEM FOR IDENTIFYING SENSORS ON MACHINES

TECHNICAL FIELD

The present disclosure relates to methods and systems for identifying identical sensors positioned in distinct locations on a machine. More particularly, the present disclosure relates to methods and systems for identifying the specific positions of a plurality of identical sensors by associating a signal from each of the plurality of identical sensors with a part of the machine when the part is placed in a predefined stationary state.

BACKGROUND

In a machine, e.g., a construction machine, multiple sensors are positioned on various parts (e.g., movable parts) of the machine to identify a position and/or an orientation of each such part of the machine. Based on data received from the multiple sensors, a controller, e.g., an engine control unit (ECU) of the machine, may generate commands to move one or more of the parts to desired positions for accomplishing various functions of the machine. Generally, the sensors that are positioned on the various parts of the machine are identical sensors having the same part number and providing the same type of outputs. This makes it difficult for the controller to uniquely identify each sensor and/or to distinguish between data received from the multiple sensors and/or their corresponding locations on the machine, e.g., during a start of the machine.

Korean Patent 101928507 relates to a guidance system including an angle sensor for implementing automatic assignment of communication IDs in an excavator. The guidance system facilitates determination of a position of a bucket of the excavator through the angle sensors by moving a linkage of the excavator.

SUMMARY OF THE INVENTION

In one aspect, the disclosure is directed towards a method for identifying a sensor among a plurality of identical sensors on a machine. The method includes comparing, by a controller, a unique value of a parameter detected by the sensor with a predefined value of the parameter. The unique value of the parameter is detected in a predefined stationary state of at least one part of a plurality of parts of the machine. The method further includes associating, by the controller, the unique value of the parameter detected by the sensor with the at least one part when the unique value of the parameter matches with the predefined value of the parameter. The predefined value of the parameter corresponds to a value of the parameter attained by the at least one part in the predefined stationary state of the at least one part.

In another aspect, the disclosure is directed towards a system for identifying a sensor among a plurality of identical sensors on a machine. The system includes a controller configured to compare a unique value of as parameter detected by the sensor with a predefined value of the parameter. The unique value of the parameter is detected in a predefined stationary state of at least one part of a plurality of parts of the machine. The controller is further configured to associate the unique value of the parameter detected by the sensor with the at least one part when the unique value of the parameter matches with the predefined value of the parameter. The predefined value of the parameter corresponds to a value of the parameter attained by the at least one part in the predefined stationary state of the at least one part.

In yet another aspect, the disclosure relates to a machine. The machine includes a plurality of parts, a plurality of identical sensors positioned on the plurality of parts and a system for identifying a sensor among the plurality of identical sensors. The system includes a controller configured to compare a unique value of a parameter detected by the sensor with a predefined value of the parameter. The unique value of the parameter is detected in a predefined stationary state of at least one part of the machine. The controller is further configured to associate the unique value of the parameter detected by the sensor with the at least one part. When the unique value of the parameter matches with the predefined value of the parameter. The predefined value of the parameter corresponds to a value of the parameter attained by the at least one part in the predefined stationary state of the at least one part.

BRIEF DESCRIPTION OF THE DRAWINGS

FIG. 3 is an exemplary orientation data of one or more parts of the exemplary machine of FIG. 1 when the one or more parts of the exemplary machine is positioned in a pre-defined stationary state, in accordance with an embodiment of the present disclosure.

DETAILED DESCRIPTION

Figure 1:
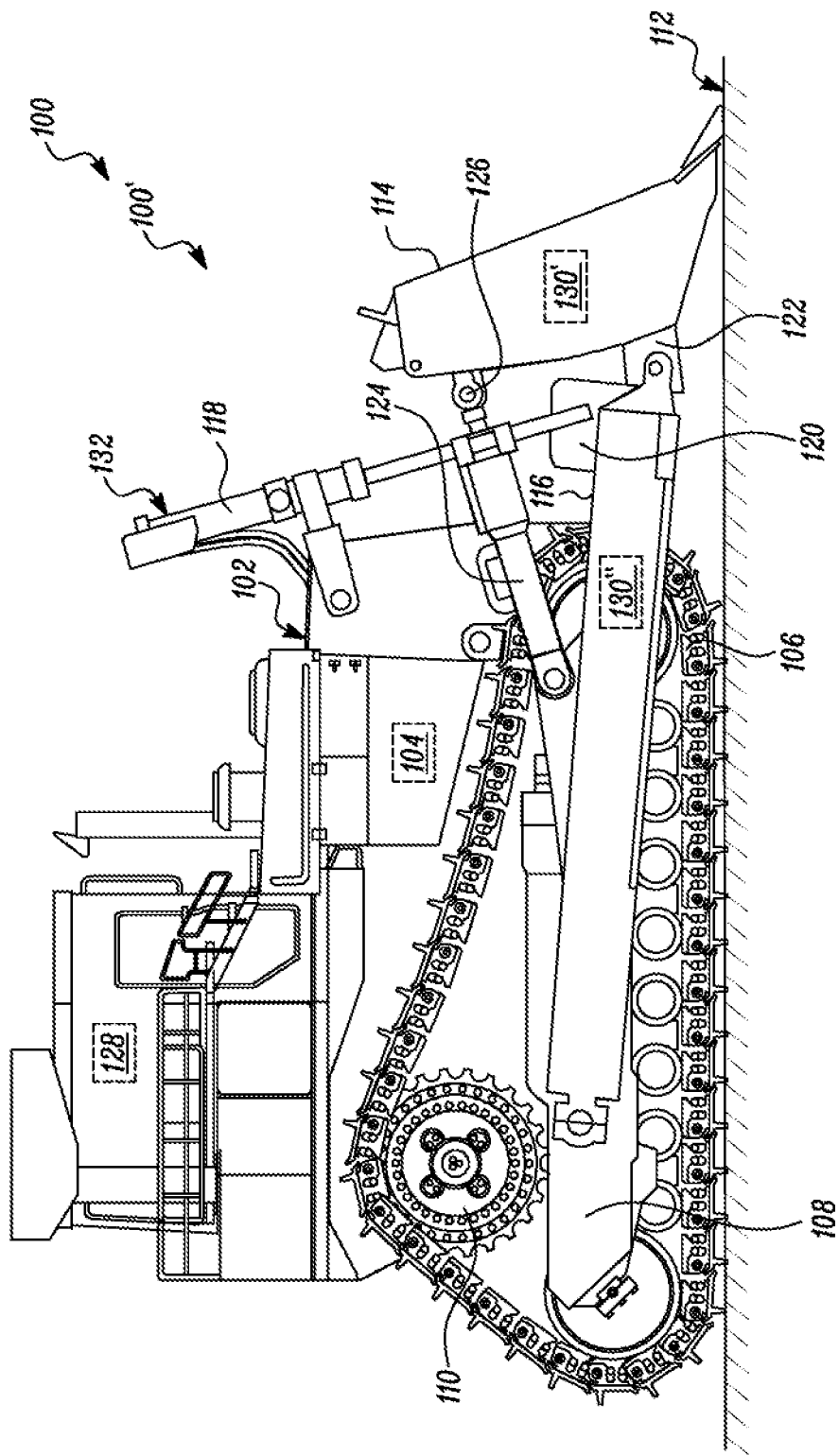
FIG. 1 is a side view of an exemplary machine, in accordance with embodiment of the present disclosure.

Referring to FIG. 1, an exemplary machine 100 is illustrated. The machine 100 may be a construction machine, such as a track type tractor 100', although aspects of the present disclosure may be applied to other machines, such as excavators, shovels, loaders, graders, and other purpose-built machines that may be customized to suit various operational parameters and requirements. For example, the purpose-built machines may include autonomous/semi-autonomous machines, and the like. Reference will now be made in detail to specific embodiments or features, examples of which are illustrated in the accompanying drawings. Wherever possible, the same reference numbers will be used throughout the drawings to refer to the same or the like parts.

The machine 100 may include a frame 102 and a power source, e.g., an engine 104, supported on the frame 102. Traction members, such as endless tracks 106, may be operatively coupled to the frame 102, e.g., around a track frame structure 108, as shown. For example, one endless track 106 may be provided on each side (i.e., a left side and a right side) of the frame 102. The engine 104 and a transmission (not shown) may be operatively connected to drive sprockets 110, which in turn may drive the endless tracks 106 to propel the machine 100 over a ground surface 112. The ground surface 112 may also be representative of a worksite over which the machine 100 is configured to operate.

The machine 100 includes a work implement 114, such as a blade or a bucket, as shown, for engaging the ground surface 112 and pushing material (e.g., debris, rocks, soil, dirt, etc.) from one location to the other location. The work implement 114 may be pivotably connected relative to the frame 102 by arms 116 extending from the track frame structure 108. Two arms 116 may be provided, one disposed towards the left side of the frame 102 and the other disposed towards the right side of the frame 102. Since FIG. 1 represents a side view of the machine 100, only one arm 116 is visible. Although the structure and arrangement of the machine 100 is shown, variations in the machine's structure and rearrangement of various components and sections may be contemplated. For example, a position of the engine 104, the work implement 114, and the associated components, may differ from what has been disclosed in the present disclosure.

The machine 100 may include a fluid actuation system 132 comprising one or more first hydraulic cylinders 118 and one or more second hydraulic cylinders 124. The one or more first hydraulic cylinders 118 may be pivotally coupled between the frame 102 and an end 120 of the one of the arms 116 which is in turn coupled to a first portion 122 of the work implement 114. An actuation of the one or more first hydraulic cylinders 118 may allow the first portion 122 of the work implement 114 to be moved up and down e.g., along a height of the frame 102. Further, the one or more second hydraulic cylinders 124 may be pivotally coupled between the track frame structure 108 and another portion 126 of the work implement 114. The one or more second hydraulic cylinders 124, when actuated, may allow a pivotal movement of the work implement 114 with respect to the track frame structure 108. The movement of the work implement 114, the arms 116, and various other parts of the machine 100 may be controlled by a joystick or other input devices, e.g., an operator interface 204 (shown in FIG. 2), as may be provided in an operator station 128 of the machine 100. In some examples, the operator interface 204 may be situated remotely to the machine 100.

In accordance with various embodiments of the present disclosure, it may be noted that the work implement 114 and the arms 116 fall under the larger ambit of being considered as parts (among many parts) of the machine 100 that are movable with respect to each other (and with respect to a reference, e.g., the ground surface 112). Accordingly, the work implement 114 and the arms 116 may be referred to as 'parts 114, 116' or 'movable parts 114, 116' of the machine 100, hereinafter. One or more aspects of the present disclosure shall be discussed with reference to said movable parts (i.e., the work implement 114 and the arms 116) of the machine 100. Because the machine 100 may include a multitude of other parts which may move with respect to one another, it will be appreciated that aspects of the present disclosure, discussed by reference to the work implement 114 and the arms 116, may be extended and applied to all such parts of the machine 100. Therefore, the reference to the work implement 114 and the arms 116 may be viewed as exemplary.

The parts 114, 116 may be moved to a myriad of configurations with respect to each other. For example, the parts 114, 116 may be pivoted with respect to each other to achieve substantially infinite angular variations therebetween. In some embodiments, the parts 114, 116 of the machine 100 are movable to exude a unique parameter or a unique orientation relative to a reference (e.g., the ground surface 112) such that the parts 114, 116 attain a predefined stationary state. Although not limited, the predefined stationary state may be a resting state of the parts 114, 116, with the work implement 114 being placed on the ground surface 112 and the arms 116 being coupled to the work implement 114 when the work implement 114 is placed on the ground surface 112 (see FIG. 1).

It may be noted that the parts 114, 116 may define corresponding (or a unique) orientations with respect to the reference (e.g., the ground surface 112) in the resting state or any other predefined stationary state. According to one embodiment the predefined stationary state of the parts 114, 116 may be attained manually, e.g., by accessing the joystick or the other input devices provided in the operator station 128 of the machine 100. The joystick or the other input devices may control the one or more first hydraulic cylinders 118 and the one or more second hydraulic cylinders 124 to manually move the parts 114, 116 to the predefined stationary state. Alternatively, the predefined stationary state may be achieved by a control system 202 (as described in FIG. 2 below), which, for example, may control the first hydraulic cylinders 118 and the second hydraulic cylinders 124 and may automatedly move the parts 114, 116 to a specific configuration, and thus attain the predefined stationary state.

The machine 100 further includes a plurality of sensors 130 for detecting the orientation of the parts 114, 116. The sensors 130 may be identical sensors having the same part number and providing the same type of outputs. In accordance with various embodiments of the present disclosure, the sensors 130 may be orientation sensors or accelerometers or any other type of sensors that detect and generate similar type of outputs such as, orientation data or acceleration vector. The sensors 130 may be positioned in distinct locations such as on the parts 114, 116 of the machine 100. The sensors 130 may include a first sensor 130' and a second sensor 130". In an exemplary embodiment, the first sensor 130' is positioned on the work implement 114 and the second sensor 130" is positioned on the arms 116 of the machine 100. When the parts 114, 116 are moved, the first sensor 130' and the second sensor 130" may move along and may detect the orientation of the corresponding parts 114, 116 relative to the reference (e.g., the ground surface 112).

Figure 2:
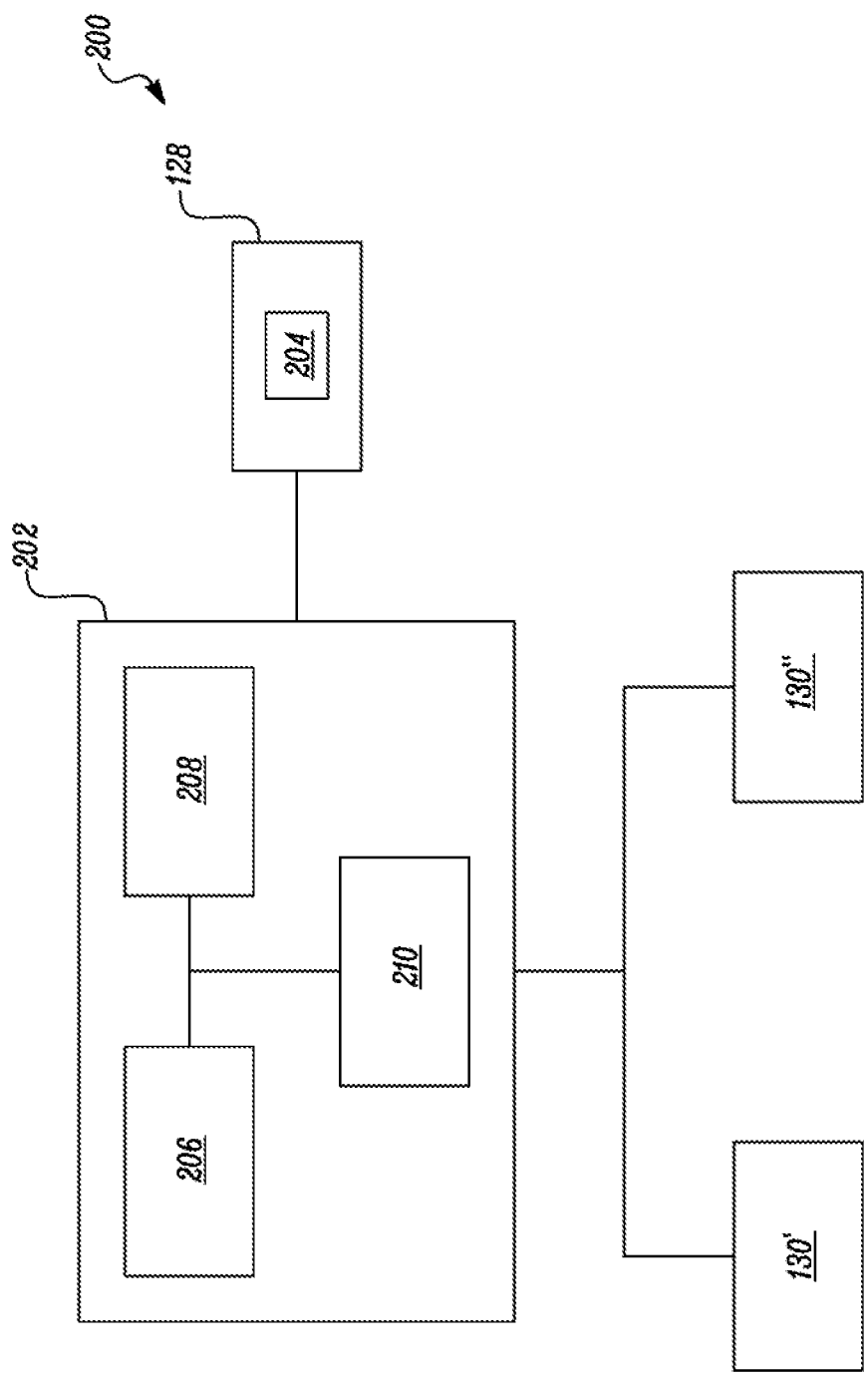
FIG. 2 is a system for identifying a sensor among a plurality of identical sensors on the exemplary machine of FIG. 1, in accordance with an embodiment of the present disclosure.

Referring to FIGS. 1 and 2, the machine 100 includes a control system 202 for identifying the identical sensors 130 by identifying the specific positions of the sensors 130 (e.g., one or both of the first sensor 130' and the second sensor 130") positioned in distinct locations (i.e., parts 114, 116) on the machine 100. The control system 202 is communicably coupled to the sensors 130 in a network 200 and may be configured to receive a signal including a unique value of a parameter such as orientation or acceleration vector detected by each of the sensors 130. For the sake of clarity, the unique value of a parameter may be hereinafter referred to as orientation data in the forthcoming disclosure.

The orientation data from the sensors 130 is utilized by the control system 202 to identify each sensor 130 by associating the orientation data from each sensor 130 with at least a part (i.e., one of the parts 114, 116) of the machine 100, e.g., during a start of the machine 100. Upon identification of a specific position of each sensor 130 on the machine 100, the orientation data detected by the sensors 130 may be used to generate various commands so as to move the parts 114, 116 to a multitude of desired positions during operation.

The control system 202 may include an Engine Control Unit or Engine Management System of the machine 100. As shown, the control system 202 may include a transceiver 206 including a transmitter circuitry and a receiver circuitry (not shown), a memory unit 208, and a controller 210. Although not shown, the control system 202 may also include an antenna, an antenna switch, duplexer, circulator, or other isolative means for intermittently providing signals from the transmitter circuitry to the antenna and from the antenna to the receiver circuitry. Although not shown, a person with ordinary skill in the art would appreciate that the control system 202 may also include one or more other means such as wires or buses for transmitting and receiving data from other devices. The control system 202 may be an integrated unit containing at least all the elements depicted in FIG. 2, as well as any other elements required for the control system 202 to perform its various functions. Alternatively, the control system 202 may include a collection of interconnected units or devices, wherein such units or devices perform functions that are equivalent to the functions performed by the individual elements of the control system 202.

The transceiver 206 may be configured to enable the control system 202 in transmitting and receiving data to and from the sensors 130 and the operator interface 204. In this regard, the transceiver 206 may include a circuitry to enable transmissions over a wireless or wired link. In one example, the transceiver 206 of the control system 202 may be configured to receive the orientation data from the sensors 130 positioned on the parts 114, 116 when the parts 114, 116 are positioned in the predefined stationary state. In accordance with various embodiments of the present disclosure, the transceiver 206 may be configured to receive a command from the operator interface 204 pertaining to the movement of the parts 114, 116 of the machine 100 to the predefined stationary state, e.g., at the start of the machine 100.

The memory unit 208 of the control system 202 may be configured to store predefined values of the parameter (the predefined values of the parameter shall be hereinafter referred to as predefined orientation data) related to the parts 114, 116 of the machine 100 with respect to the ground surface 112 in the predefined stationary state. The predefined orientation data may be stored in a form of a table 300 (as shown in FIG. 3) or any other format suitable for storage of such data. The table 300 may include reference to the parts 114, 116 of the machine 100 and the predefined orientation data of each part 114, 116 with respect to the ground surface 112 the predefined stationary state. As shown in FIG. 3, the predefined orientation for the work implement 114 is 90° and the predefined orientation for the arms 116 is 70° in the predefined stationary state of the work implement 114 and the arms 116. The predefined orientation data may include an orientation angle or a range of orientation angles that may be attained by the parts 114, 116 of the machine 100 in the predefined stationary state.

The controller 210, of the control system 202, may include one or more microprocessors, microcontrollers, DSPs (digital signal processors), state machines, logic circuitry, or any other device or devices that process information based on operational or programming instructions. Such operational or programming instructions are stored in the memory unit 208, for example, as a set of instructions. The memory unit 208 can be an (integrated circuit) memory chip containing any form of RAM (random-access memory) or ROM (read-only memory), a floppy disk, a CD-ROM (compact disk read-only memory), a hard disk drive, a DVD (digital video disc), a flash memory card, external subscriber identity module (SIM) card or any other medium for storing non-transitory digital information. One of ordinary skill in the art will recognize that when the controller 210 has one or more of its functions performed by a state machine or logic circuitry, the memory unit 208 containing the corresponding operational instructions can be embedded within the state machine or logic circuitry.

The controller 210 may be configured to move the parts 114, 116 of the machine 100 to the predefined stationary state. The controller 210 may be further configured to determine the attainment of the predefined stationary state of parts 114, 116 based on one or more operational parameters such as a flow of fluid within the one or more first hydraulic cylinders 118 and the one or more second hydraulic cylinders 124. In an exemplary embodiment of the present disclosure, the controller 210 may be configured to determine the flow of fluid by communicating with a mass flow sensor (not shown) provided within a hydraulic circuit associated with the one or more first hydraulic cylinders 118 and the one or more second hydraulic cylinders 124. In another embodiment, the controller 210 may be configured to determine the attainment of the predefined stationary state of parts 114, 116 based on a position of a plurality of components, such as, based on a positioning of a rod of the one or more first hydraulic cylinders 118 with respect to a body of the one or more first hydraulic cylinders 118).

Upon moving the one or more parts 114, 116 of the machine 100 to the predefined stationary state, the controller 210 may compare the orientation data detected by each of the sensors 130 in the predefined stationary state of the parts 114, 116 with the predefined orientation data stored in the table 300 of the memory unit 208. The controller 210 may be further configured to co-relate and associate the orientation data detected by the first sensor 130' with the part 114 when the orientation data detected by the first sensor 130' matches or falls within the range of the predefined orientation data corresponding to the part 114 in the predefined stationary state of the part 114. In accordance with exemplary embodiments of the present disclosure, the controller 210 may be configured to associate the orientation data detected by the first sensor 130' with the work implement 114 when the orientation data detected by the first sensor 130' is equal to (or within a predefined range of) 90° as defined in the table 300. Similarly, the controller 210 may be configured to co-relate and associate the orientation data detected by the second sensor 130" with the part 116 when the orientation data detected by the second sensor 130" matches or falls within the range of the predefined orientation data corresponding to the part 116 in the predefined stationary state of the part 116.

The controller 210 may be further configured to identify a specific position of each of the sensors 130 based on the match and assign a unique identifier to each of the sensors 130 to identify the sensors 130. Once the sensors 130 are identified, the orientation data received from the sensors 130 is used by the controller 210 to generate commands to move corresponding parts of the machine 100 to desired positions for accomplishing various functions of the machine 100.

In another embodiment of the present disclosure, the movement of the parts 114, 116 of the machine 100 may be controlled manually by the joystick. In such cases, the controller 210 may be configured to determine that the parts 114, 116 of the machine 100 are in the predefined stationary state based on a confirmation input received from an operator (e.g., via the operator interface 204) of the machine 100. The controller 210, upon receiving the confirmation input from the operator, identifies the sensors 130 of the machine 100.

INDUSTRIAL APPLICABILITY

In operation, the identical sensors 130 having the same part number and providing the same type of outputs such as orientation data are positioned in distinct locations on the machine 100. The sensors 130 are positioned in distinct locations such as parts 114, 116 of the machine 100 in order to identify position and/or orientation of the associated parts 114, 116 of the machine 100. Based on the orientation data received from the sensors 130, the control system 202 generates commands to move the puts 114, 116 of the machine 100 to desired positions for accomplishing various functions of the machine 100. However, when a machine 100 is turned-on for the first time, the sensors 130 are not associated with the parts of the machine 100 on which they are positioned. For instance, the first sensor 130' positioned on the part 114 the machine is not associated and co-related to the part 114. In other words, the first sensor 130' positioned on the part 114 may be detecting and transmitting the orientation data of the part 114 to the control system 202 as the first sensor 130' is positioned on the part 114 but the control system 202 may not be able to identify that the orientation data detected by the first sensor 130' is the orientation of the part 114 as the first sensor 130' is not yet associated with the part 114 in the control system 202. Similarly, the second sensor 130" positioned on the part 116 of the machine is not associated and co-related to the part 116 at the start of the machine 100. Moreover, the first sensor 130' and 130" are identical sensors of the same type and provides the same type of outputs i.e. the orientation data, and hence it becomes difficult to distinguish the first sensor 130' from the second sensor 130".

In accordance with various embodiments of the present disclosure, the controller 210 moves the parts 114, 116 of the machine 100 to the predefined stationary state, e.g., at the start of the machine 100. The controller 210 may then determine the attainment of the predefined stationary state of parts 114, 116 based on the flow of fluid within the one or more first hydraulic cylinders 118 and the one or more second hydraulic cylinders 124. In accordance with various embodiments of the present disclosure, the controller 210 may determine the flow of fluid by communicating with a mass flow sensor shown) provided within a hydraulic circuit associated with the one or more first hydraulic cylinders 118 and the one or more second hydraulic cylinders 124. In another embodiment, the controller 210 determines the attainment of the predefined stationary state of parts 114, 116 based on a position of a plurality of components, such as, based on positioning of a rod of the one or more first hydraulic cylinders 118 with respect to a body of the one or more first hydraulic cylinders 118.

In another embodiment, the movement of the parts 114, 116 are controlled manually by the joystick. In such cases, the controller 210 determines that the parts 114, 116 of the machine 100 are in the predefined stationary state based on a confirmation input received from the operator (e.g., via the operator interface 204) of the machine 100.

Upon determining that the parts 114, 116 are positioned in the predefined stationary state, the controller 210 receives the orientation data from the sensors 130 via the transceiver 206. The orientation data is detected when at least one part of the parts 114, 116 of the machine 100 is positioned in the predefined stationary state. Upon receiving the orientation data, the method proceeds to identification of sensors 130 as described in FIG. 4. For the sake of clarity, the forthcoming disclosure will primarily include discussions towards the identification of the first sensor 130'. However, these discussions may be applied to identify the second sensor 130' and various other identical sensors positioned in distinct locations on the machine 100, as well.

Figure 4:
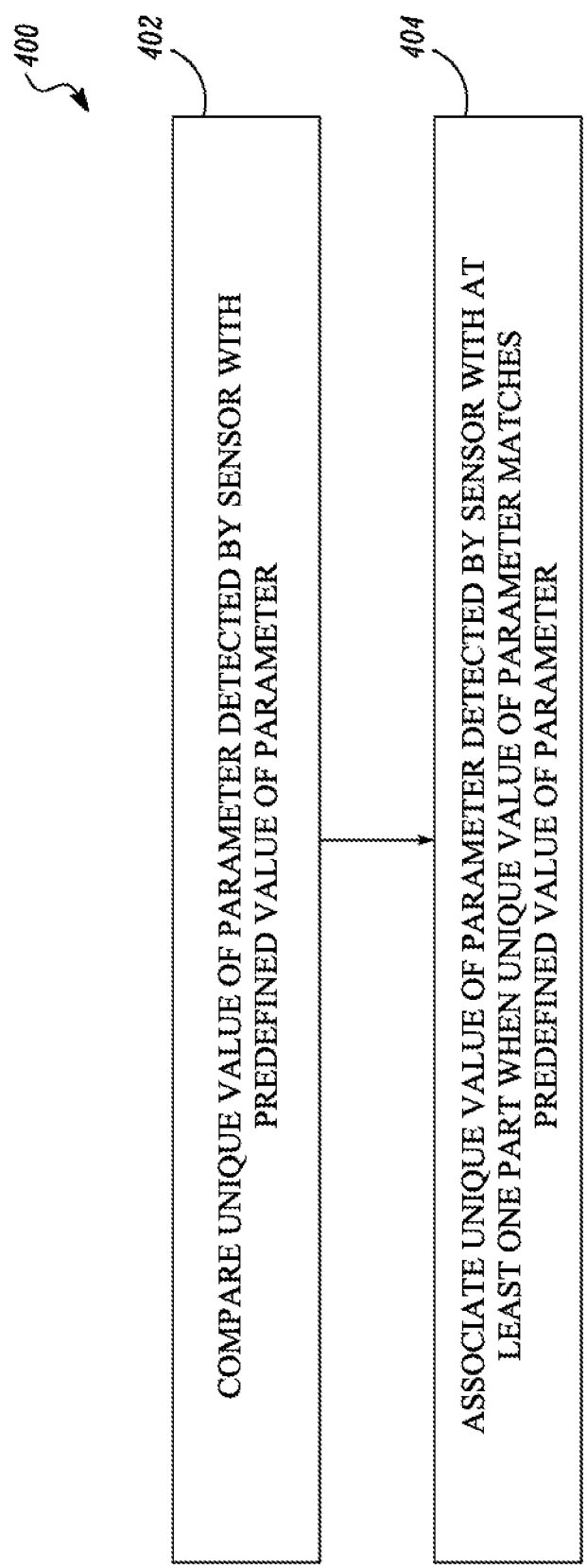
FIG. 4 is a flow chart of a method for identifying the sensor among the identical sensors on the exemplary machine of FIG. 1, in accordance with an embodiment of the present disclosure.

FIG. 4 is a flow chart of a method 400 for identifying the first sensor 130' among the sensors 130 on the machine 100 in accordance with the embodiments of the present disclosure. At 402, the controller 210 compares the orientation data detected by the first sensor 130' with the predefined orientation data stored in the memory unit 208. The predefined orientation data corresponds to an orientation attained by the at least one part of the parts 114, 116 in the predefined stationary state of the at least one part 114 or 116.

At 404, the controller 210 associates the orientation data detected by the first sensor 130' with the at least one part of the parts 114, 116 when the orientation data detected by the first sensor 130' matches with the predefined orientation data stored in the memory unit 208. The method ends at 404. Since the orientation of the part 114 of the machine 100 will be equal or closer to the orientation data detected by the first sensor 130' positioned on the part 114 in a particular positioning state, the embodiments of the present disclosure relies on moving the part 114 of the machine 100 to a predefined stationary state in which the orientation of part 114 of the machine 100 is known and then associating the orientation data detected by the first sensor 130' with the part 114 of the machine 100 when the orientation data detected by the first sensor 130' matches with the orientation of the part 114 of the machine 100 in the predefined stationary state.

Upon association of the orientation data detected by the first sensor 130' with the part 114, the specific position of the first sensor 130' on the machine 100 (i.e. on the part 114) is identified based on the match and a unique identifier is assigned to the first sensor 130' to identify the first sensor 130'. Once the first sensor 130' is uniquely identified, the orientation data detected by the first sensor 130' is used to generate commands to move the part 114 of the machine 100 to desired positions, and thus the machine 100, with the parts 114, 116, may enter into a work cycle.

The present disclosure provides a simple and time efficient solution to identify the sensors positioned in distinct locations on the machine 100 in a predefined stationary state of the parts 114, 116. The method 400 facilitates detection of the positioning of the sensors on the machine 100, without having to move the machine 100 to an area or a zone where the parts 114, 116 can be manipulated. Effectively, with the control system 202, the machine 100 need not be moved to any different/pre-specified zone for identifying the sensors, rather the control system 202 enables the identification of the sensors at any indoor and/or outdoor location or zone.

It should be understood that the above description is intended for illustrative purposes only and is not intended to limit the scope of the present disclosure in any way. Thus, one skilled in the art will appreciate that other aspects of the disclosure may be obtained from a study of the drawings, the disclosure, and the appended claim.

What is claimed is:

1. A method for identifying a sensor among a plurality of identical sensors on a machine, the method comprising:
   comparing, by a controller, a unique value of a parameter detected by the sensor with a predefined value of the parameter, the unique value of the parameter being detected in a predefined stationary state of at least one part of a plurality of parts of the machine; and
   associating, by the controller, the unique value of the parameter detected by the sensor with the at least one part when the unique value of the parameter matches with the predefined value of the parameter,
   wherein the predefined value of the parameter corresponds to a value of the parameter attained by the at least one part in the predefined stationary state of the at least one part, the predefined value of the parameter being a range of orientation angle.

2. The method of claim 1, further includes:
moving, by the controller, the at least one part to the predefined stationary state; and
receiving, by the controller, the unique value of the parameter from the sensor in the predefined stationary state of the at least one part.

3. The method of claim 2, further includes:
determining, by the controller, the at least one part to have attained the predefined stationary state based on one or more operational parameters of an actuation system associated with moving the at least one part to the predefined stationary state.

4. The method of claim 3, wherein the actuation system includes a fluid actuation system and the one or more operational parameters includes a flow of fluid within a circuit associated with the fluid actuation system.

5. The method of claim 1, wherein the at least one part of the plurality of parts is movable to exude a unique orientation relative to a reference.

6. The method of claim 1, wherein associating the unique value of the parameter detected by the sensor with the at least one part of the plurality of parts of the machine includes:
identifying, by the controller, a position of the sensor on the machine based on the match; and
assigning, by the controller, a unique identifier to the sensor to identify the sensor.

7. The method of claim 1, wherein the sensor includes an orientation sensor and the parameter includes an orientation of the at least one part with respect to a reference.

8. A system for identifying a sensor among a plurality of identical sensors on a machine, the system comprising:
a controller configured to:
compare a unique value of a parameter detected by the sensor with a predefined value of the parameter, the unique value of the parameter being detected in a predefined stationary state of at least one part of a plurality of parts of the machine; and
associate the unique value of the parameter detected by the sensor with the at least one part when the unique value of the parameter matches with the predefined value of the parameter,
wherein the predefined value of the parameter corresponds to a value of the parameter attained by the at least one part in the predefined stationary state of the at least one part, the predefined value of the parameter being a range of orientation angle.

9. The system of claim 8, wherein the controller is further configured to:
move the at least one part to the predefined stationary state; and
receive the unique value of the parameter from the sensor in the predefined stationary state of the at least one part.

10. The system of claim 9, wherein the controller is further configured to:
determine the at least one part to have attained the predefined stationary state based on one or more operational parameters of an actuation system associated with moving the at least one part to the predefined stationary state.

11. The system of claim 10, wherein the actuation system includes a fluid actuation system and the one or more operational parameters includes a flow of fluid within a circuit associated with the fluid actuation system.

12. The system of claim 8, wherein the at least one part of the plurality of parts is movable to exude a unique orientation relative to a reference.

13. The system of claim 8, wherein the controller is configured to associate the unique value of the parameter detected by the sensor with the at least one part of the plurality of parts of the machine by:
identifying a position of the sensor on the machine based on the match; and
assigning a unique identifier to the sensor to identify the sensor.

14. The system of claim 8, wherein the sensor includes an orientation sensor and the parameter includes an orientation of the at least one part with respect to a reference.

15. The system of claim 8, wherein the sensor is positioned on the at least one part.

16. A machine comprising:
a plurality of parts;
a plurality of identical sensors positioned on the plurality of parts; and
a system for identifying a sensor among the plurality of identical sensors, the system including:
a controller configured to:
compare a unique value of a parameter detected by the sensor with a predefined value of the parameter, the unique value of the parameter being detected in a predefined stationary state of at least one part of the plurality of parts of the machine; and
associate the unique value of the parameter detected by the sensor with the at least one part when the unique value of the parameter matches with the predefined value of the parameter,
wherein the predefined value of the parameter corresponds to a value of the parameter attained by the at least one part in the predefined stationary state of the at least one part, the predefined value of the parameter being a range of orientation angle.

17. The machine of claim 16, wherein the at least one part of the plurality of parts is movable to exude a unique orientation relative to a reference.

18. The machine of claim 16, wherein the controller is further configured to:
move the at least one part to the predefined stationary state; and
receive the unique value of the parameter from the sensor in the predefined stationary state of the at least one part.

19. The machine of claim 16, wherein the controller is configured to associate the unique value of the parameter detected by the sensor with the at least one part of the plurality of parts by:
identifying a position of the sensor on the machine based on the match; and
assigning a unique identifier to the sensor to identify the sensor.

20. The machine of claim 16, wherein the sensor includes an orientation sensor and the parameter includes an orientation of the at least one part with respect to a reference.

* * * * *